United States Patent [19]

Screen

[11] Patent Number: 5,214,823
[45] Date of Patent: Jun. 1, 1993

[54] CASTORS WITH SWIVEL DAMPING

[76] Inventor: Stafford T. Screen, 66 Stevens Road, Wollescote, Stourbridge, West Midlands, DY9 OXY, England

[21] Appl. No.: 647,055

[22] Filed: Jan. 29, 1991

[30] Foreign Application Priority Data

Jan. 30, 1990 [GB] United Kingdom ................ 9002038

[51] Int. Cl.$^5$ ............................................. B60B 33/00
[52] U.S. Cl. .................................... 16/35 D; 16/35 R
[58] Field of Search ............................. 16/35 D, 35 R

[56] References Cited

U.S. PATENT DOCUMENTS

| | | | |
|---|---|---|---|
| 2,787,804 | 4/1957 | Noelting et al. | 16/35 R |
| 4,084,288 | 4/1978 | Black | 16/21 |
| 4,432,116 | 2/1984 | Schultz. | |
| 4,667,365 | 5/1987 | Martinek. | |

FOREIGN PATENT DOCUMENTS 0062514 10/1982 European Pat. Off. .
2064955 6/1981 United Kingdom .

*Primary Examiner*—John Sipos
*Assistant Examiner*—Carmine Cuda
*Attorney, Agent, or Firm*—Young & Thompson

[57] ABSTRACT

To prevent "shimmying", due to uncontrolled swivelling of a castor during non-engagement of its wheel or wheels with the ground, frictional resistance to swivelling is provided. An upper or lower cap or cover for the bearing between the castor body and its mounting head can thus be non-rotatably engaged with the mounting head and frictionally engaged with the body. Additionally, or instead, a spring washer around the mounting head in an aperture in the body containing the bearing can provide this friction.

15 Claims, 1 Drawing Sheet

CASTORS WITH SWIVEL DAMPING

FIELD OF THE INVENTION

The invention relates to castors and, in particular, to castors for supporting articles such as wheel chairs and supermarket and airport trolleys which experience a great deal of movement in use, possibly over relatively uneven ground or support surfaces.

BACKGROUND OF THE INVENTION

It often occurs that a castor pivots about its swivel axis if it becomes free of the support surface, because of a hollow or declivity, so that when ground contact is resumed it has to turn again on the swivel axis to resume its correct orientation, with a consequential disruption to the smooth advance of the article and the need for an extra effort on the part of the person pushing the article. It is accordingly desirable to provide means whereby this "shimmying" effect is reduced or relieved.

It is accordingly an object of the invention to provide a castor adapted to maintain its orientation about its swivel axis.

It is also an object of the invention to provide a castor having frictional means opposing swivelling of the castor body on the castor mounting portion.

It is a further object of the invention to provide a castor in which swivelling movement is opposed by friction between portions of the castor conventionally provided in a castor.

SUMMARY OF THE INVENTION

The invention accordingly provides a castor comprising a mounting head for mounting the castor on an article which it is to support, a castor body journalling castor wheel means for rotation about a wheel axis, a bearing by which the body is journalled on the mounting head for rotation about an upright swivel axis spaced from the wheel axis, and means providing frictional opposition to the swivelling of the castor body on the mounting head.

The frictional opposition to swivelling can be provided by a variety of means, for example, by a cap or cover at least partially enclosing the bearing. The cap or cover can thus be non-rotatably engaged with one of the castor body and the mounting head and have a peripheral portion frictionally engaging the other of the body and the head. The cover may thus have an inner periphery non-rotatably engaged with the mounting head and an outer rim or skirt portion in frictional engagement with a transverse face or a circular cylindrical portion of the body respectively. The invention then is carried into effect merely by modification of a part or parts conventionally present in a castor, without the need for provision of extra parts.

The cover may instead apply a frictional resistance to swivelling indirectly, as by means of a spring member, suitably a Belleville washer, intermediate between the cover and one or other of the castor body and the mounting head, or between the cover and the bearing part connected to the body or bearing part connected to the head. The cap or cover providing or applying the frictional resistance may be either an upper or a lower cover, located above or below the bearing respectively.

Alternatively, a spring washer acting between the mounting head and the castor body can be retained by means other than a cap or cover. For example, where the mounting head comprises a stem extending through an inner bearing part and held in place by a nut, the spring washer can be retained on the stem by the nut or other element of the mounting stem structure so as to engage at its outer edge with the outer bearing part secured to the castor body, or with the castor body directly.

The invention can conveniently be embodied in a castor of which the mounting head comprises a shaft extending through the inner race of a ball bearing constituting the castor bearing. The castor body can then comprise a pair of side arms extending down to an axle journalling a castor wheel from a yoke portion having a bore within which is received the outer race of the ball bearing. An annular upper cover can then extend downwardly and outwardly from around the mounting shaft to engage around the yoke portion, the frictional engagement being preferably with the yoke portion and the non-rotatable engagement with the shaft. The cover may instead have a sleeve portion around the mounting stem one end of which bears against the inner periphery of a spring or Belleville washer adjacent the bearing, the outer periphery of which engages its outer race.

Alternatively, the spring washer can be located beneath the bearing. Its inner periphery can be contacted by a nut on a threaded lower end portion of the stem, or an equivalent abutment, and its outer periphery can engage the outer race of the ball bearing or the yoke portion directly.

The various means described for effecting the frictional resistance to swivelling may be combined or employed independently.

The invention will be understood to provide a solution to the "shimmying" problem described above which is extremely simple and consequently highly cost-effective.

BRIEF DESCRIPTION OF THE DRAWINGS

The invention is further described below, by way of example, with reference to the accompanying drawings, in which.

DETAILED DESCRIPTION OF THE INVENTION

Figure 1:
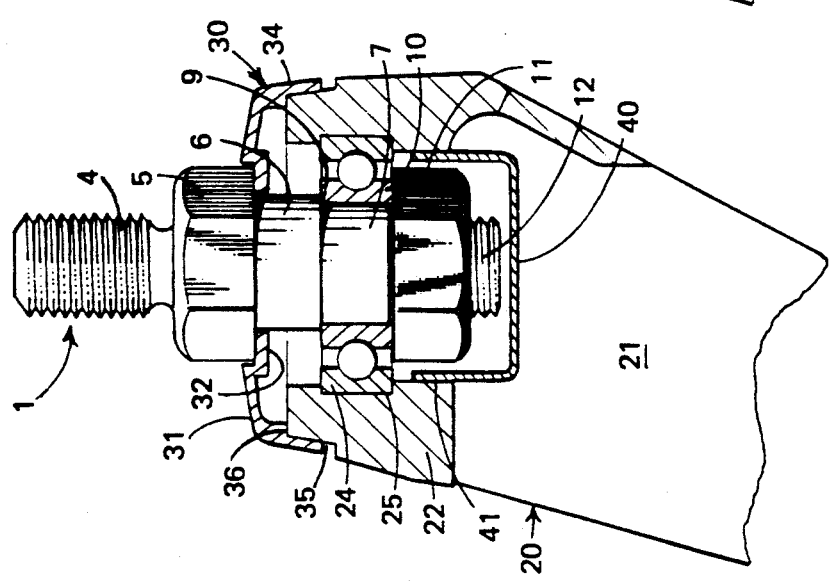
FIG. 1 is a partial sectional side view of a first castor embodying the invention.

The castor illustrated in FIG. 1 comprises a mounting head 1 for the castor by which it can be mounted on a wheelchair or other article to be supported. The head 1 comprises a shaft or stem provided with a screw-threaded upper end portion 4 which can be received within a tapped recess in the wheelchair. Beneath this upper end portion 4 there is provided a hexagonal portion 5 of greater diameter beneath which is located an upper circular cylindrical portion 6 and a lower circular cylindrical portion 7 of slightly smaller diameter so that an annular step 9 is formed between the two cylindrical portions.

The tubular inner ball race 10 of a high quality ball bearing is received on the lower cylindrical portion 7 and is held in place between the step 9 and a hexagonal nut 11 received on a threaded lower end portion 12 of the head.

The castor also comprises a castor body 20 having a pair of side arms 21, of which only one is seen, extending downwardly from a yoke 22 and journalling a castor wheel (not shown) between them at their lower ends. The yoke 22 has a vertical bore and the outer race 24 of the ball bearing is secured within a groove 25 in the wall of the bore. The depth of the groove 25 is such that only the inner part of the race 24 extends into the bore, so that the upper and lower end surfaces of the race form inwardly projecting steps. The castor body 20 may be moulded in plastics material, and the outer ball race 24 can then be integrally moulded into the yoke 22. The axis of the ball bearing defines the upright swivel axis of the castor about which the body 20 can swivel relative to the mounting head 1.

In accordance with the invention, the castor includes also an annular upper cap or cover 30 which serves both to protect the ball bearing from the entry of dust or dirt, and to provide frictional restraint against the swivelling movement of the body 20 on the head 1. The cover 30 can be moulded in plastics material and has an annular main portion 31 with a hexagonal inner periphery which engages around the hexagonal portion 5 of the head 1 and a downwardly and inwardly stepped portion 32 which engages underneath it. The cover 30 is consequently held against rotation relative to the mounting stem by the non-circular shape of the portion 5 and the cover inner periphery.

At its outer edge, the main cover portion 31 has a downwardly descending skirt 34 surrounding the upper end of the yoke 22. The outer surfaces of the skirt 34 and the yoke 22 are at least approximately continuous because of a step 35 formed around the top of the yoke. The interior surface of the skirt 34 and the outer surface of the yoke 22 above the step 35 are in frictional engagement, and this frictional engagement provides a resistance to swivelling movement sufficient to prevent any tendency to shimmying. An annular step 36 is formed within the cover 30 between the main portion 31 and the skirt 34 and the lower face of the step can frictionally engage the top of the yoke 22 to provide a frictional resistance to swivelling instead of or in addition to that between the skirt and the outer surface of the yoke.

To enclose the bearing from below, a generally bowl-shaped lower cap or cover 40 has a skirt portion 41 partially received within the lower part of the bore of the yoke 22, the bore and the skirt portion being shaped to make a snap-fit connection. The cover 40 engages only the yoke 22 and provides no frictional resistance to swivelling but could be modified to engage also the nut 11 so as to do so.

Figure 3:
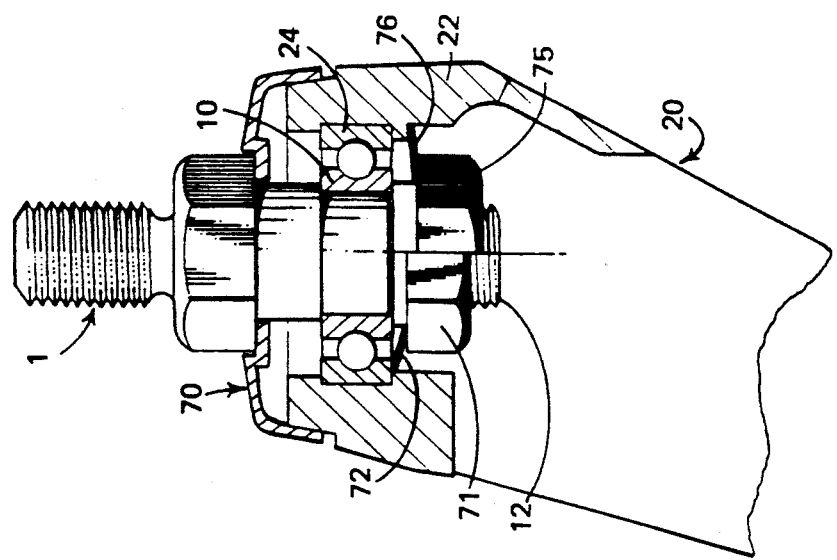
FIG. 3 is a like view, on the left hand side, of a third castor embodying the invention, and on the right hand side, a fourth such castor.
Figure 2:
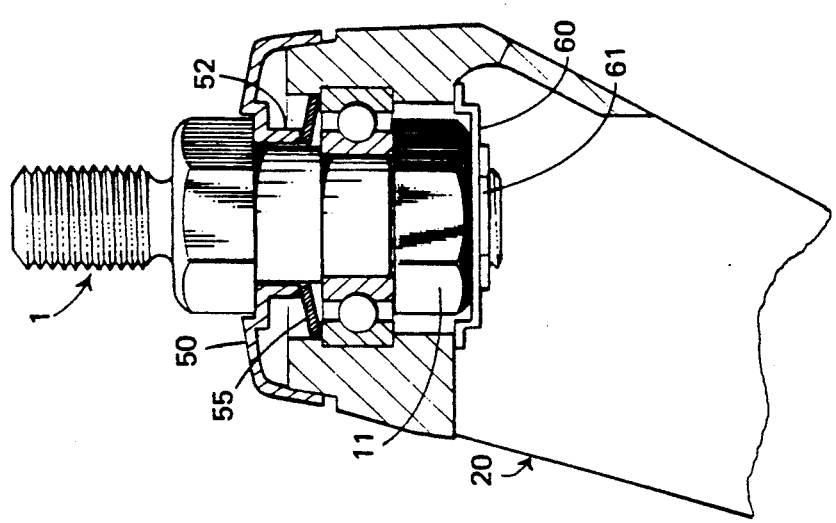
FIG. 2 is a like view of a second castor embodying the invention.

In the castors illustrated in FIGS. 2 and 3, the mounting stem 1, the castor body 20 and the bearing are identical to those of FIG. 1.

In FIG. 2, an upper cover 50 is generally similar to the cover 30 of FIG. 1 and differs primarily in that it incorporates a sleeve portion 52 extending downwardly around the upper cylindrical portion 6 of the mounting head 1. The castor of FIG. 2 also includes an additional part, namely, a Belleville washer located around the upper cylindrical portion 6 and having an inner peripheral edge engaged by the lower end of the sleeve portion 52. The outer peripheral edge of the washer 55 engages the upper end of the outer ball race 24 projecting inwardly from the bore in the yoke 22. The shape of the washer 55 allows it to be spaced above the inner ball race 10 and it will be evident that there will be a frictional resistance to swivelling at the surfaces of the washer which engage the sleeve portion 52 and the outer ball race 24. The cover 50 is shown as lacking the step 36, and its skirt may not frictionally engage the yoke 22, but additional frictional restraint may be obtained by either such means if desired, as in the castor of FIG. 1.

As also appears from FIG. 2, the ball bearing may be protected from entry of dust and dirt from beneath by a lower cap or cover 60 of stepped generally annular form shaped somewhat similarly to the upper covers 30 and 50 in having a hexagonal inner periphery engaging the nut 11 on the lower end portion 12 of the head 1, on which it is retained by a smaller lower nut 61. Frictional restraint to swivelling movement is applied by the lower cover by engagement with the under surface of the yoke 22. This frictional restraint may be in addition to or instead that supplied by an upper cover such as the cover 30 and/or by cover 50 and the Belleville washer 55.

In the castors shown in FIG. 3, an upper cover 70 resembles the cover 50 of FIG. 2, but the sleeve portion 52 is omitted, and the cover plays no part in providing friction to swivelling movement.

Referring to the castor shown on the left of FIG. 3, the inner ball race 10 is held in place on the stem between the step 9 and a hexagonal nut 71 on the end portion 12. A Belleville washer 72 is received with its inner peripheral edge engaged by an upwardly facing annular step formed around the nut 71. The washer 72 extends upwardly to its outer peripheral edge which engages the lower end of the outer ball race 24. The washer 72 functions to provide frictional resistance to swivelling in the same way as the Belleville washer 55 of FIG. 2.

In the castor shown at the right-hand side of FIG. 3, the inner ball race 10 is held on the stem by a hexagonal nut 75 again provided with an upwardly facing annular step engaging the inner peripheral edge of a Belleville washer 76. The yoke 22 is provided with a downwardly facing annular step and the washer 76 extends outwardly and upwardly to engage this step. The Belleville washer 76 functions to provide frictional resistance to swivelling in effectively the same way as the washer 72 but by contacting the castor body directly.

Either castor of FIG. 3 is preferably completed with a lower cover functioning similarly to the cover 40, and the upwardly facing annular step may be provided by the upper end surface of the nut, which is then spaced from the inner ball race 10 by a washer of suitable axial length It is to be understood that a castor embodying the invention can incorporate any one or more of the various means disclosed for providing frictional resistance to swivelling.

As will be evident to those skilled in the art, the invention can be embodied in a variety of ways other than as specifically described and illustrated, without departing from its scope.

I claim:
1. A castor comprising:
   a castor body having an upper portion, an aperture in said upper portion, and a groove within said aperture,
   castor wheel means,
   means journalling said castor wheel means on said castor body for rotation about a wheel axis,
   a mounting head, said mounting head being adapted for mounting said castor to an article to be supported by said castor, bearing means by which said castor body is carried by said mounting head for rotation about a swivel axis spaced from said wheel axis, said bearing means being contained in said upper portion aperture and including an outer race partially received in said groove, and annular friction means adapted to provide frictional resistance to the swivelling of said body on said mounting head about said swivel axis, said annular friction means comprising a spring washer having inner and outer edge regions, said inner and outer edge regions being in engagement with said mounting head and with one of the projecting ends of said outer race respectively.

2. The castor of claim 1 further comprising annular steps formed on said mounting head and within said aperture respectively, and wherein said spring washer engages said annular steps.

3. The castor of claim 1 further comprising an annular step formed on said mounting head and wherein said inner edge region of said spring washer engages said annular step.

4. The castor of claim 1 further comprising an annular cover extending between said mounting head and said body upper portion, said annular cover having a lower end portion, and wherein said inner edge region of said spring washer is engaged by said lower end portion.

5. A castor comprising:
a castor body, said castor body having a yoke portion, an opening in said yoke portion, and a castor wheel support portion depending from said yoke portion,
castor wheel means journalled by said wheel support portions of said castor body for rotation about a wheel axis,
a castor mounting head, said castor mounting head having an upper portion adapted for securement to an article to be supported by said castor and a lower portion received in said opening in said yoke portion of said castor body,
bearing means received in said opening in said yoke portion of said castor body and receiving therein said lower portion of said castor mounting head to thereby provide for relative swivelling of said castor body and said castor mounting head about a swivel axis spaced from said wheel axis, and
a spring of Belleville washer received within said opening and having inner and outer peripheral regions, said spring or Belleville washer engaging said castor mounting head at said inner peripheral region and engaging said castor body at said outer peripheral region to thereby frictionally oppose said relative swivelling of said castor mounting head and said castor body.

6. A castor comprising:
a castor body having an upper region and a lower region,
a bore in said castor body upper region,
castor wheel means journalled at said lower region of said castor body for rotation about a wheel axis,
a mounting head having an upper portion and a lower portion, said upper portion being adapted for mounting said castor to an article to be supported by said castor,
bearing means operative between said upper region of said castor body and said lower portion of said mounting head to journal said castor body on said mounting head for relative rotation about an upright swivel axis spaced from said wheel axis, and
annular friction means engaging said mounting head and said upper region of said castor body to frictionally oppose said relative rotation about said swivel axis, said annular friction means comprising a spring washer, and said lower portion of said mounting head and said spring washer being within said bore.

7. The castor of claim 6, wherein inner and outer regions of said spring washer are engaged respectively by a first annular step around said lower portion of said head and by a second annular step within said bore.

8. The castor of claim 7 wherein said bearing means is located within said bore and provides said second annular step.

9. The castor of claim 7, further comprising a cover around said head portion protectively closing said bore from above, said cover including a sleeve portion around said head portion, said sleeve portion having a lower end constituting said first annular step.

10. The castor of claim 6, wherein said bearing means comprises a ball bearing having an outer race secured within said bore and an inner race secured around lower portion of said head, and wherein said outer race engages said spring washer at the outer edge region thereof.

11. A castor comprising:
a castor body having an upper region, a lower region, and a bore extending through said upper region,
castor wheel means journalled at said lower region of said castor body for rotation about a wheel axis,
a mounting head having an upper portion and a lower portion, said upper portion being adapted for mounting said castor to an article to be supported by said castor, and said lower portion being received in said bore of said castor body,
bearing means operative between said upper region of said castor body and said lower portion of said mounting head to journal said castor body on said mounting head for relative rotation about an upright swivel axis spaced from said wheel axis,
friction means operative between said castor body and said mounting head to frictionally oppose said relative rotation about said swivel axis, and
means locating said friction means within said bore.

12. The castor of claim 11, wherein said annular friction means comprises a spring washer.

13. The castor of claim 11, further comprising an annular cover around said mounting head and protectively closing said bore from above.

14. A castor comprising:
a castor body having an upper region and a lower region,
castor wheel means journalled at said lower region of said castor body for rotation about a wheel axis,
a mounting head having an upper portion and a lower portion, said upper portion being adapted for mounting said castor to an article to be supported by said castor,
bearing means operative between said upper region of said castor body and said lower portion of said mounting head to journal said castor body on said mounting head for relative rotation about an upright swivel axis spaced from said wheel axis,
annular cover means extending between said mounting head and said castor body upper region to protect said bearing means from above, and annular friction means separate from and beneath said annular cover means, said annular friction means engaging said mounting head and said upper region of said castor body to frictionally oppose said relative rotation about said swivel axis.

15. The castor of claim 14, wherein said annular friction means is engaged at the inner region thereof by said annular cover means and wherein the outer region of the annular friction means engages said upper portion of said mounting head.

* * * * *